United States Patent [19]

Aly et al.

[11] Patent Number: 4,810,428
[45] Date of Patent: Mar. 7, 1989

[54] HIGH EFFICIENCY RADIAL TYPE VAPOR DISTRIBUTOR FOR PACKED TOWERS

[75] Inventors: Fouad A. Aly, Newtown, Pa.; Simon Y. Yeung, Lawrenceville, N.J.

[73] Assignee: Mobil Oil Corporation, New York, N.Y.

[21] Appl. No.: 125,980

[22] Filed: Nov. 27, 1987

[51] Int. Cl.$^4$ .............................................. B01F 3/04
[52] U.S. Cl. ...................... 261/96; 98/40.13; 239/552
[58] Field of Search ............... 261/96, 94; 98/40.13, 98/40.18; 239/502, 552

[56] References Cited

U.S. PATENT DOCUMENTS

| | | | |
|---|---|---|---|
| 1,923,393 | 8/1933 | Pickup | 239/552 |
| 2,262,683 | 11/1941 | Kauffman et al. | 239/552 |
| 2,596,105 | 5/1952 | Schneible | 261/109 |
| 2,606,074 | 8/1952 | Ackermann | 299/154 |
| 2,621,722 | 12/1952 | Abrams | 158/114 |
| 2,928,331 | 3/1960 | Averill | 98/40.13 |
| 3,107,597 | 10/1963 | Person | 98/40.13 |
| 3,205,809 | 9/1965 | Sweeney et al. | 98/40.13 |
| 3,479,146 | 11/1969 | Hochman et al. | 23/288 |
| 3,525,197 | 8/1970 | Sheehan | 261/94 |
| 3,560,167 | 2/1971 | Bruckner et al. | 261/94 |
| 3,997,634 | 12/1976 | Downs | 261/122 |
| 4,142,456 | 3/1979 | Locker | 98/40 D |

Primary Examiner—Tim Miles
Attorney, Agent, or Firm—Alexander J. McKillop; Charles J. Speciale; Robert B. Furr, Jr.

[57] ABSTRACT

A vapor distribution device for installation inside a vessel at the outlet of conduit means, a packed bed tower employing said vapor distribution device, and a method of sizing said vapor distribution device are disclosed. The present invention provides uniform vapor flow distribution across the vessel diameter.

8 Claims, 2 Drawing Sheets

HIGH EFFICIENCY RADIAL TYPE VAPOR DISTRIBUTOR FOR PACKED TOWERS

BACKGROUND OF THE INVENTION

This invention relates to the field of separation processes. More particularly, this invention relates to vapor distribution in packed distillation and absorption towers.

The purpose of a packed bed column is to provide contact area between the ascending vapor stream and the descending liquid stream. Thus packed bed columns are widely used for absorption and distillation. In an absorption tower, for example, vapor is fed to the bottom of the tower while liquid is fed to the top. As the liquid falls through the packing, it contacts the vapor rising from the bottom of the tower.

Vapor and liquid charge rates may be varied over a range of values based on tower diameter, height of the packed section, and type of packing material. Localized high vapor velocities disturb the even distribution of the falling liquid on the tower packing material and at relatively low liquid feed rates cause excessive liquid entrainment. Thus the maldistribution of vapor must be avoided to ensure optimum tower operation. Uniform vapor and liquid distribution allows maximum throughput for a given tower design. On the other hand, introducing vapor non-uniformly to a packed tower for a separation process, heat transfer, or any other heat and mass transfer operation will lower the maximum obtainable capacity and efficiency. Therefore it is important to maximize the uniformity of vapor distribution to the packed tower.

The most commonly used vapor distributor is the perforated pipe design. This device consists of a pipe or interconnected pipes with holes in the pipe walls facing downward or perpendicular to the length of the tower. Vapor flows into the empty space at the bottom of the packed tower and then flows upward into the packed bed.

The perforated-pipe vapor distributor and other previous designs have several disadvantages. First, they require substantial clearance inside the tower to provide the dead space needed for vapor distribution. Second, a decrease in the pressure drop available across the perforated-pipe distributor will cause the effluent vapor to become unevenly distributed among the perforations. Third, the high vapor velocity generated at the perforations frequently results in rapid erosion of the distributor piping. Fourth, the high pressure drop required makes the perforated-pipe type distributor undesirable for vacuum-type operations. Due to the substantial limitations of the available vapor distributors, tower performance is often compromised in the interest of operating flexibility by using a vapor inlet pipe with no distributor attached.

Fluid distribution devices designed to be attached to the outlet of conduit means are used in a broad spectrum of applications. The following is an overview of these applications.

U.S. Pat. No. 2,606,074 issued to Ackerman discloses an air distributing nozzle having radially extensive fins to be attached to the outlet of conduit means. The device distributes air evenly to defrost plate glass windows.

U.S. Pat. No. 2,621,722 to Abrams teaches a novel gas burner nozzle which distributes gas radially outward through slotted openings formed between adjacent plates in a series of parallel annular plates.

U.S. Pat. No. 3,479,146 teaches a fluid flow distributor including a dished lower baffle, a conical section intermediate baffle upstream of the dished lower baffle, and an upper annular baffle upstream of the intermediate baffle. The distributor is said to provide a uniform velocity gradient over a large range of inlet flow velocities.

A diffuser adapted to aerate a fluid medium is disclosed in U.S. Pat. No. 3,997,634 to Downs. The diffuser consists essentially of two elements, namely, a T-shaped member, the leg of which is provided with a central bore and adapted to be connected to a source of a fluid medium, such as air, under pressure, while the top is preferably flat and disc shaped. Overlying the top is a cap or cover which is flexible and adapted to lie contiguous with the surface of the top. The cap is provided with an annular rim which engages the top along and under the peripheral edge thereof. The diffuser assembly also includes a check valve to prevent back flow when the diffuser is submerged in a liquid medium.

Finally, U.S. Pat. No. 4,142,456 issued to Locker discloses an air diffuser for a conditioned air outlet. The diffuser separates the flow of air from the outlet to the ambient into a plurality of diverging air jet streams by means of a plurality of regularly disposed wedge-shaped fins, with the result that air flowing from the outlet is diffused and substantially uniformly distributed throughout an enclosure.

SUMMARY OF THE INVENTION

The present invention is a radial-type vapor distributor to be positioned at the outlet of conduit means comprising an annular plate having a first and a second face, with the first face positioned flush against and concentric with the outlet of the conduit means, and at least two rectangular plates having top and bottom edges, with the top edges attached to the second face of the annular plate, and an end plate having the bottom edges of the rectangular plates attached to a single face of the end plate. This novel design distributes the incoming vapor by directing it radially from the center of the packed tower toward the tower shell. The vapor expands rapidly as it flows radially outward, thus providing a uniform distribution of vapor. The radial-type vapor distributor vanes are sized such that the effluent vapor enters the packed section of the tower at a uniform velocity equal to the superficial velocity of the tower.

THE DRAWINGS

DETAILED DESCRIPTION

Figure 1:
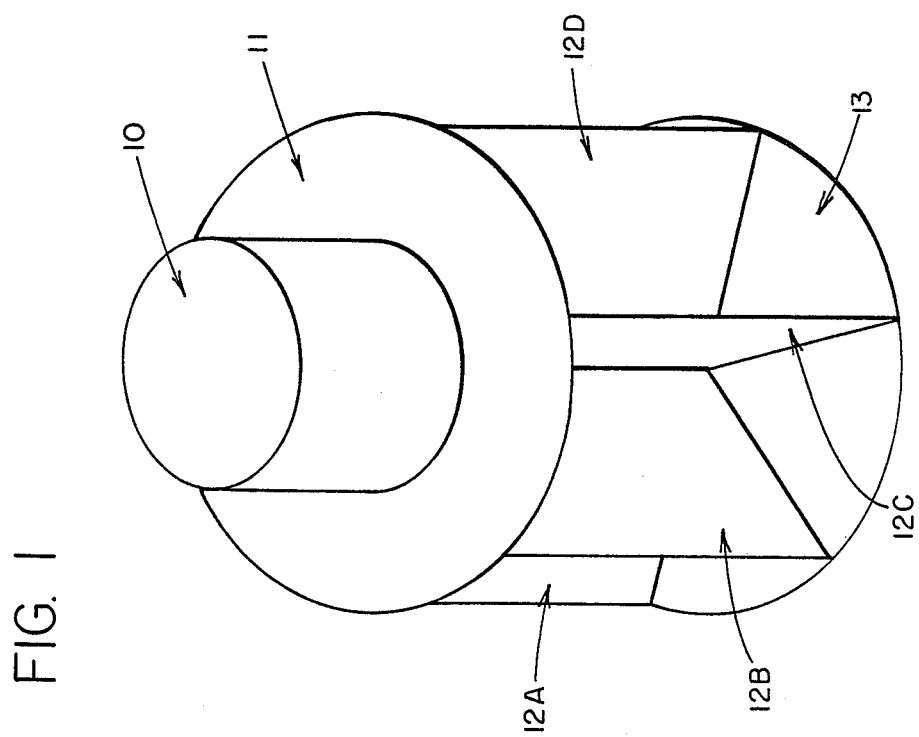
FIG. 1 shows a simplified isometric view of the radial-type vapor distributor.

FIG. 1 shows a simplified isometric view of the subject radial-type vapor distributor. Vapor flows to the distributor through conduit means 10 which is attached to and concentric with the annular plate 11. While a flat annular plate 11 is shown, the annular plate may be concave or convex. Six vanes are attached to the annular plate 11 and four vanes 12A, 12B, 12C and 12D are designated. While more or less than six vanes may be used, for example, two to twelve, or more, only two are required. The vanes are shown perpendicular to the annular plate but may be attached at an angle from about 5° to about 95°. The bottom edges of the vanes are attached to a bottom plate 13. While a flat bottom plate 13 is shown, the bottom plate may be concave or convex. The vanes may intersect as shown at or near the geometric center of the annular plate 11. The preferred material of construction is sheet or plate metal stock.

Figure 3:
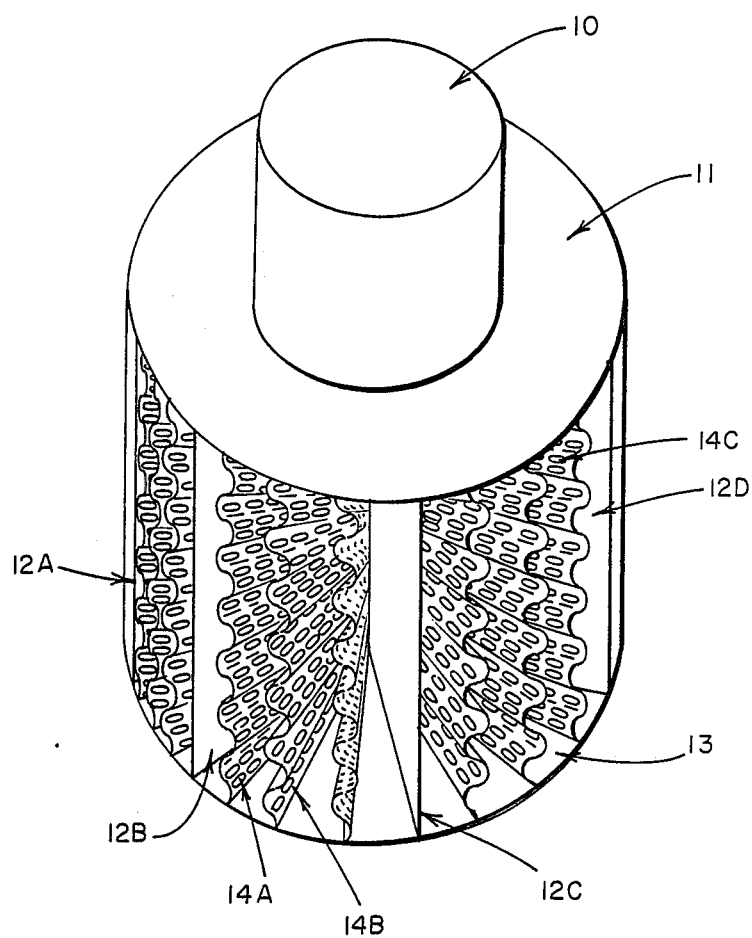
FIG. 3 shows a simplified isometric view of the radial-type vapor distributor with structural packing material positioned between the vanes.

Structural packing material may be positioned between adjacent vanes to further enhance vapor distribution. FIG. 3 illustrates the installation of sheets of structural packing material 14A, 14B and 14C (only three sheets are designated) between the vanes of the distributor. The distributor of FIG. 3 is otherwise identical to that of FIG. 1. Examples of this material include branch names such as Koch Flexipac and Glitsch Gempack.

Figure 2:
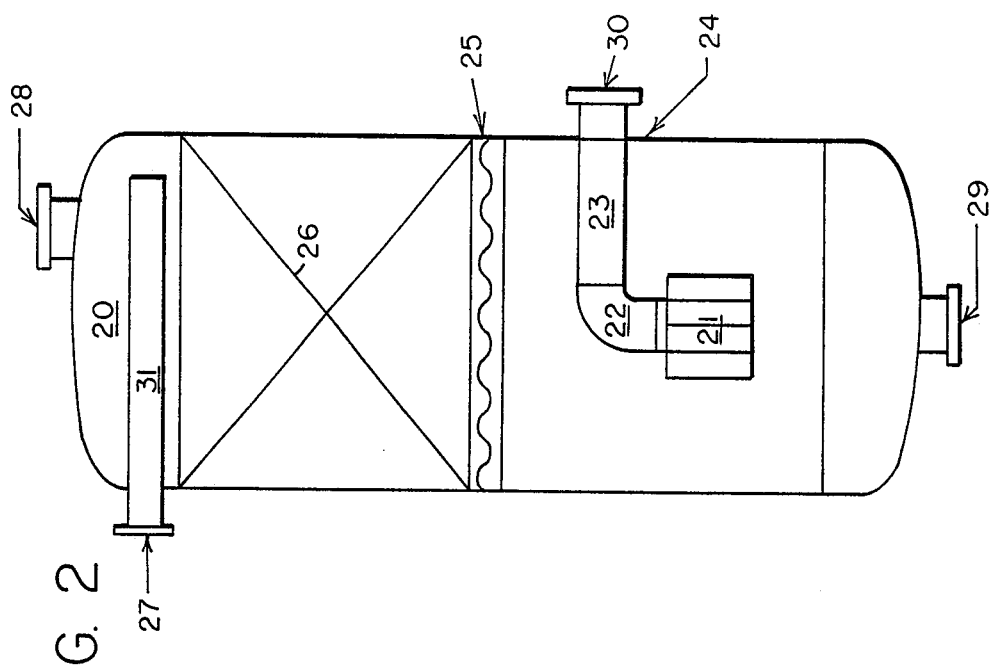
FIG. 2 shows a simplified cross-section of a packet tower illustrating the preferred installation of the radial-type vapor distributor.

FIG. 2 shows a simplified cross-section of a packed tower 20 with packing support grid 25 and packed section 26. Liquid enters the tower through liquid inlet 27, flows through liquid distribution means 31, falls through packed section 26 and leaves via liquid outlet 29. Vapor enters the tower 20 through vapor inlet 30, rises through packed bed 26 and exits through vapor outlet 28. In the preferred embodiment, the radial-type vapor distributor is attached, e.g. welded, to a 90° pipe elbow 22 which is attached, e.g. welded, to a nozzle 23 extending through the outer shell 24 of the packed tower 20. The nozzle 23 should be of sufficient length such that the radial-type vapor distributor is concentric with the packed tower 20. If the radial-type vapor distributor is installed using an existing nozzle connection, a section of pipe may be substituted for the portion of the nozzle 23 extending inside the wall of the vessel.

The radial-type vapor distributor 21 is shown directed downward in FIG. 2. While the downward orientation is shown, the radial-type vapor distributor is effective using a downward or an upward orientation.

The rectangular vanes 12A, 12B, 12C and 12D are sized to provide a uniform vapor velocity throughout the tower cross-section. It has been found that the vertical length of the vanes is the critical dimension and that the most uniform flow distribution may be obtained by sizing the vanes in accordance with the following equation:

$$H_d = \frac{A_t}{P_t}$$

where $H_d$ = Height of the distributor vane [feet]
$A_t$ = Cross-sectional area of the tower [feet$^2$]
$P_t$ = Inside circumference of the tower [feet]

For example, given a tower with an inside diameter of four feet:

$$H_d = \frac{A_t}{P_t} = \frac{\pi d^2/4}{\pi d}$$

$$H_d = \frac{d}{4}$$

$$H_d = 1 \text{ ft.}$$

EXAMPLE

A tray-type distillation tower was converted to a packed-bed steam distillation tower used to strip light hydrocarbons from a lubricating oil stream. The tower dimensions and process conditions were as follows:

| | |
|---|---|
| Tower Inside Diameter: | 30 in. |
| Height of Packed Section: | 6 ft. |
| Packing Material: | 1 in. Pall rings |
| Operating Pressure: | 2–10 PSIA |
| Steam Charge Rate: | 750–2000 lb/hr. |
| Oil Charge Rate: | 600 BBL/Day |
| Steam Inlet Pressure: | 120–150 PSIG |

The required vane height was calculated according to the technique described above.

$$H_d = \frac{A_t}{P_t}$$

$$H_d = \frac{\pi d^2/4}{\pi d}$$

$$H_d = \frac{30 \text{ in.}}{4} = 7.5 \text{ in.}$$

The installed design has resulted in uniform vapor distribution as evidenced by the lack of hydrocarbon liquid entrainment in the effluent gas stream. This is a particularly surprising and unexpected result, as the relatively high steam flowrate and relatively low oil flowrate would generally tend to cause maldistribution, liquid entrainment, and a consequential loss in tower efficiency.

We claim:

1. A packed bed tower having a vapor distribution device installed therein which is positioned at the outlet of conduit means, said vapor distribution device comprising:
   (a) an annular plate having a first and a second face, said first face positioned flush against and concentric with said outlet of said conduit means; and
   (b) at least two rectangular plates having top and bottom edges, said top edges attached to said second side of said annular plate; and
   (c) an end plate having said bottom edges of said rectangular plates attached to a single face thereof.

2. The device of claim 1 wherein said rectangular plates intersect said second face of said annular plate at an angle greater than about 5° and less than about 95°.

3. The device of claim 2 further comprising at least three rectangular plates.

4. The device of claim 3 wherein said rectangular plates intersect.

5. The device of claim 4 wherein each said rectangular plate is perpendicular to said annular plate and said end plate.

6. The device of claim 4 wherein the length of said rectangular plates measured between said top edge and said bottom edge of each said plate is equal to the inside cross-sectional area of said vessel divided by the inside circumference of said vessel.

7. The device of claim 5 wherein the length of said rectangular plates measured between said top edge and said bottom edge of each said plate is equal to the inside cross-sectional area of said vessel divided by the inside circumference of said vessel.

8. The device of claim 3 wherein structural packing material is positioned between the adjacent vanes.

* * * * *

UNITED STATES PATENT AND TRADEMARK OFFICE
CERTIFICATE OF CORRECTION

PATENT NO. : 4,810,428
DATED : March 7, 1989
INVENTOR(S) : F.A. Aly et al

It is certified that error appears in the above-identified patent and that said Letters Patent is hereby corrected as shown below:

Col. 2, line 55      "packet" should be --packed--
Col. 3, line 19      "branch" should be --brand--

Signed and Sealed this

Twelfth Day of June, 1990

*Attest:*

HARRY F. MANBECK, JR.

*Attesting Officer*     *Commissioner of Patents and Trademarks*